United States Patent
Stemple et al.

(10) Patent No.: US 7,112,937 B1
(45) Date of Patent: Sep. 26, 2006

(54) DEVICE AND METHOD FOR DRIVING A MOTOR

(75) Inventors: Steve P. Stemple, Vancouver, WA (US); Paul D. Bliley, Vancouver, WA (US); David Branson, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/263,323

(22) Filed: Oct. 31, 2005

(51) Int. Cl.
*H02P 7/29* (2006.01)

(52) U.S. Cl. ........................ 318/478; 318/503; 318/504

(58) Field of Classification Search ........ 318/478–479, 318/503–504, 590, 599, 671; 388/904, 907.5
See application file for complete search history.

(56) References Cited

U.S. PATENT DOCUMENTS

| | | | |
|---|---|---|---|
| 4,119,907 A | 10/1978 | Quinn | |
| 4,336,563 A | 6/1982 | Suzuki | |
| 4,383,209 A * | 5/1983 | Lewis | 318/696 |
| 4,462,070 A | 7/1984 | Iida | |
| 4,507,592 A * | 3/1985 | Anderson | 318/268 |
| 4,739,462 A | 4/1988 | Farnsworth et al. | |
| 5,329,214 A | 7/1994 | Williamson et al. | |
| 5,661,389 A | 8/1997 | Seno et al. | |
| 5,726,849 A | 3/1998 | Nakamura | |
| 5,838,128 A * | 11/1998 | Maiocchi et al. | 318/439 |
| 5,936,371 A | 8/1999 | Bolash et al. | |
| 6,087,798 A | 7/2000 | Ishida | |
| 6,184,665 B1 * | 2/2001 | Salina et al. | 323/282 |
| 6,199,023 B1 * | 3/2001 | Kliman | 702/67 |
| 6,204,627 B1 * | 3/2001 | Watanabe et al. | 318/729 |
| 6,229,276 B1 | 5/2001 | Fitzgibbon et al. | |
| 6,316,777 B1 | 11/2001 | Parrish et al. | |
| 6,414,960 B1 | 7/2002 | Kuhn et al. | |
| 6,472,930 B1 | 10/2002 | Morimoto et al. | |
| 6,498,446 B1 * | 12/2002 | Menegoli et al. | 318/254 |
| 6,498,449 B1 * | 12/2002 | Chen et al. | 318/434 |
| 6,653,829 B1 * | 11/2003 | Henry et al. | 324/207.21 |
| 6,719,435 B1 | 4/2004 | Nakamura | |
| 6,843,423 B1 | 1/2005 | Fruhauf et al. | |
| 6,933,773 B1 | 8/2005 | Mattson et al. | |
| 6,975,087 B1 * | 12/2005 | Crabill et al. | 318/590 |
| 2001/0007517 A1 | 7/2001 | Fujikawa | |
| 2004/0227470 A1 | 11/2004 | Benveniste et al. | |
| 2005/0067660 A1 | 3/2005 | Uehara et al. | |

* cited by examiner

Primary Examiner—Bentsu Ro (57) ABSTRACT

A motor control device having memory for storing data indicative of a control mode and a pulse width modulation (PWM) value and logic that applies the pulse width modulation value to a voltage provided to a motor if the data indicative of the control mode indicates voltage mode. The logic further controls the voltage applied to the motor based upon a motor set point value representative of the data indicative of the pulse width modulation value when the data indicative of the control mode indicates current mode.

21 Claims, 5 Drawing Sheets

DEVICE AND METHOD FOR DRIVING A MOTOR

RELATED ART

Typically, an electrical device comprises a plurality of discrete components that require power to operate at different specifications. For example, a digital camera may comprise components such as a lens, a controller, storage components, and a plurality of input/output components, and each of these components may have different voltage level specifications, e.g., minimum and maximum voltage rails.

In such a device, there is typically an alternating current (AC) source or a direct current (DC) source that supplies power to the various components in the electrical device. In this regard, the power source may be a battery that supplies a DC voltage to the various components or an AC to DC converter that converts an AC voltage to a DC voltage prior to supplying the power to the components.

In any event, the DC voltage supplied by the battery or the converter is regulated via a DC regulator circuit that controls the voltage supplied to a particular component. In this regard, the component may comprise a motor, and the regulator circuit may be an application specific integrated circuit (ASIC) that is designed to regulate the power provided to the motor.

A motor control ASIC regulates the power supplied to a motor in the device via voltage mode control or current mode control. A current mode control (CMC) ASIC receives an input that controls the current output provided to the motor. A voltage mode control (VMC) ASIC receives an input that controls the terminal voltage output to the motor.

If the component requires voltage mode control, then a voltage mode control ASIC is used to drive the component. Alternatively, if the component requires current mode control, then a current mode control ASIC is used to drive the component.

During manufacturing, different models of the same type of device, e.g., a digital camera, may be manufactured, and the different models may require different types of components having different configuration requirements. For example, a lens used in a first camera model may be a voltage mode control component, but a lens used in a second camera model of the device may be a current mode control component. For each model, the type of lens dictates which type of ASIC will be used, a voltage mode control ASIC or current mode control ASIC.

SUMMARY OF THE DISCLOSURE

Generally, the present disclosure provides a motor driver that operates in voltage mode or current mode depending upon the type of component to which it is coupled.

A device in accordance with an embodiment of the present disclosure comprises memory for storing a control mode value and a pulse width modulation (PWM) value and logic configured to modulate an input voltage to a motor based upon the PWM value if the control mode value indicates voltage mode, the logic further configured to determine a motor set point value if the control mode value indicates current mode, the logic further configured to modulate the input voltage to the motor based upon the determined motor set point value.

A method for controlling a motor in accordance with an exemplary embodiment of the present disclosure comprises storing data indicative of a control mode and a pulse width modulation PWM value in memory and modulating an input voltage provided to a motor using the PWM value if the data indicative of the control mode indicates voltage mode. The method further comprises modulating the input voltage provided to the motor based upon a motor current set point value if the data indicative of the control mode indicates current mode.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to devices and methods for controlling a motor. Particularly, a device in accordance with an exemplary embodiment the present disclosure controls a motor in voltage mode or current mode based on a control register setting.

Figure 1:
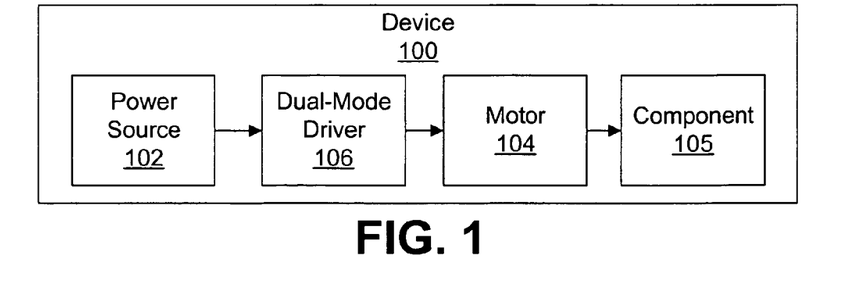
FIG. 1 is a block diagram illustrating an electrical device in accordance with an exemplary embodiment of the present disclosure.

FIG. 1 depicts an electrical device 100 in accordance with an exemplary embodiment of the present disclosure. The device 100 comprises a power source 102 and a motor 104. The motor 104 is coupled to the power source 102 via an exemplary dual-mode driver 106. Further, the motor 104 operates a component 105. For example, if the device 100 is a digital camera, the component 105 might be a lens of the camera.

The dual-mode driver 106 is preferably an application specific integrated circuit (ASIC) that controls the voltage provided to the motor 104 from the power source 102. The component 105 that is driven by the motor 104 may be operable in voltage mode or current mode.

Note that "voltage mode" refers to a driver control method in which the pulse width of an input control signal supplied to a motor driver is varied to change the effective output voltage of the driver 106. Alternatively, "current mode" refers to a control method in which the driver 106 adjusts the signal's pulse width in response to changes in a measured motor current. In this regard, the measured motor current is that current that is flowing through the motor coils when the measurement is taken.

For example, the device 100 may be, for example, a digital camera or a printer. If the device 100 is a digital camera, for example, the component 105 may comprise a lens (not specifically shown in FIG. 1). The lens may necessarily be operable in voltage mode or current mode. Whether the device is operable in voltage mode or current mode is dictated by the specifications of the lens employed.

In this regard, some lenses used in digital cameras operate in voltage mode and some lenses operate in current mode.

Thus, in an exemplary embodiment of the present disclosure, the dual-mode driver 106 operates in voltage mode or current mode, depending upon the type of component 105 to which the motor 104 is coupled. Configuring the dual-mode driver 106 so that the motor 104 is controlled via voltage mode or current mode is described further herein with reference to FIG. 2.

During operation, the power supply 102 provides a direct current (DC) voltage to the dual-mode driver 106. The dual-mode driver 106 is configured to control the time, duration, and direction that the DC voltage is provided to the motor 104. Thus, the dual-mode driver 102 varies the voltage to the motor 104 "on" and "off" at a particular rate. The dual-mode driver 106 of the present disclosure varies the DC voltage either via voltage mode control or current mode control as described herein based upon the type of component 105 to which the motor 104 is coupled.

Figure 2:
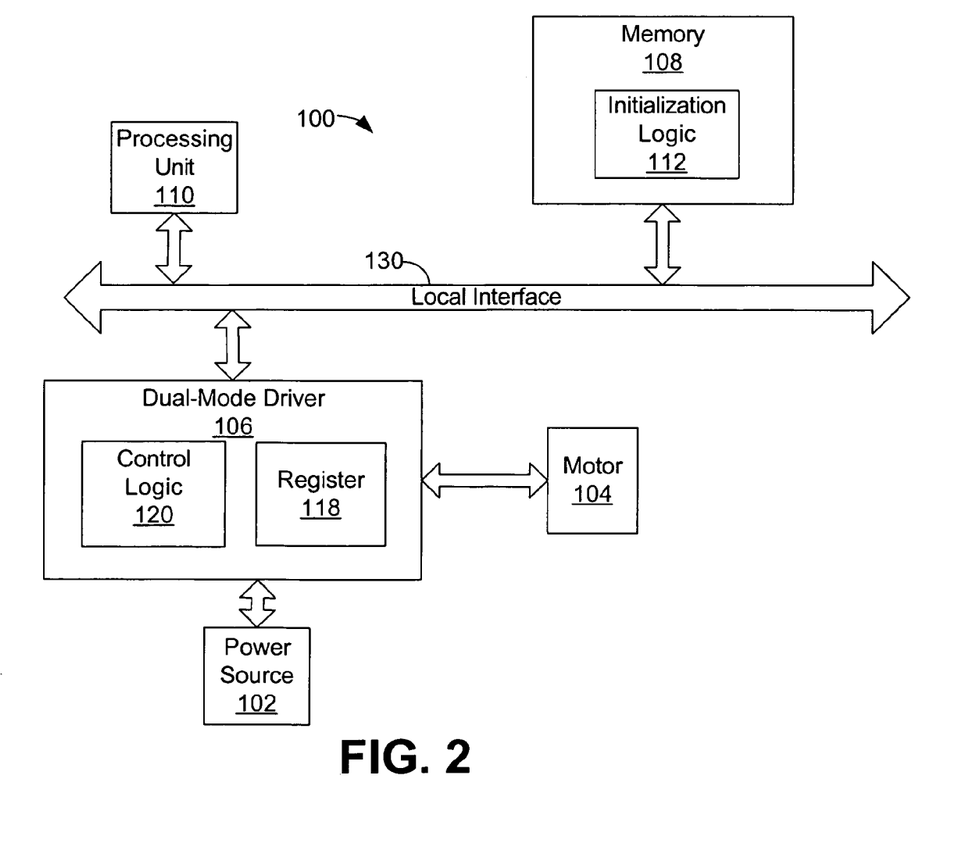
FIG. 2 is a block diagram illustrating the device of FIG. 1 in accordance with an exemplary embodiment illustrating the present disclosure.

FIG. 2 depicts a block diagram of the device 100 of FIG. 1. The device 100 comprises initialization logic 112 that may be implemented in software, hardware, or a combination thereof. In an exemplary embodiment, as is illustrated in FIG. 2, the initialization logic 112, along with its associated methodology, is implemented in software and stored in memory 108 of the device 100.

The initialization logic 112 initially determines in which mode the dual-mode driver 106 will operate. In one embodiment, the initialization logic 112 is firmware stored in memory 108. For example, the memory 108 may include erasable programmable read-only memory (EPROM) for storing the initialization logic 112. The initialization logic 102 may be configured to be specific to the mode type, e.g., voltage mode or current mode. Thus, during manufacturing, the initialization logic 112 specific to the type of mode to be used by the motor 104 is downloaded to the memory 108. For example, if the component 105, e.g., a lens, is to be controlled via voltage mode, then the initialization logic 112 specific to voltage mode is downloaded to memory 108. However, if the component 105, e.g., a lens, is to be controlled via current mode, then the initialization logic 112 specific to current mode is downloaded to memory 108.

Notably, the dual-mode driver 106 may remain consistent from one device 100 to another during manufacturing. In this regard, the same driver 106 may be installed on each device 100 regardless of the type of component 105 that will be installed on the device 100, i.e., a component 105 that requires voltage mode or a component 105 that requires current mode. Only the initialization logic 112 need be varied from device to device depending upon the type of component 105 that will be installed on the device 100.

In another embodiment, the device 100 may comprise a jumper (not shown) or a load resistor (not shown) that can be selected and/or modified during manufacturing to indicate the mode type of the component 105 that is being inserted into the device 100. When the device 100 is powered on, the initialization logic 112 may read the jumper or the load resistor to determine the mode in which the dual-mode driver 106 is to operate for the component 105.

Other methods for determining the appropriate mode type may be used in other embodiments. For example, the initialization logic 112 may communicate with the component 105. In such an example, the initialization logic 102 may be firmware that communicates with component 105 integral with the particular motor 104, and such component 105 indicates what type of mode is desired for the particular component being driven by the motor 104.

The exemplary embodiment of the device 100 depicted by FIG. 2 further comprises at least one conventional processing unit 110. Such a processing unit may be, for example, a digital signal processor (DSP) or a central processing unit (CPU) that communicates to and drives the other elements within the device 100 via a local interface 130, which can include at least one bus.

As described with reference to FIG. 1, the device 100 comprises the dual-mode driver 106. The dual-mode driver 106 further comprises control logic 120 and a register 118. The control logic 120 may be implemented in software, hardware, or a combination thereof. In one exemplary embodiment, the dual-mode driver 106 is an application specific integrated circuit (ASIC).

As described herein, the initialization logic 112 determines what type of mode is to be employed to control the motor 104, e.g., voltage mode, or current mode. When the device 100 is powered on, the initialization logic 112 transmits data to the dual-mode driver 106 indicative of the mode type, e.g., voltage mode or current mode. The control logic 120 stores such data into the register 118.

Additionally, the register 118 preferably comprises data indicative of the duty cycle, hereinafter referred to as the PWM value, that the driver 106 is to use when operating the motor 104. For example, the register 118 may comprise a nine-bit word for storing data indicative of the PWM value that is to be used by the driver 106. For a nine-bit word, there are five hundred and twelve possible values that may be used to control the motor 104. In such an example, in order to operate the motor 104 at a fifty-percent duty cycle, the initialization logic 112 might store "256" in the register for indicating a fifty percent duty cycle. Notably, the duty cycle refers to the proportion of time during which the motor 104 is to be operated.

As will be described further herein, there may be a clock (not shown) that is configured to time each duty cycle. Thus, in one embodiment, when using a nine-bit word having five hundred and twelve possible values, the clock might count from one to five hundred and twelve. Thus, from one to two hundred and fifty-six, the driver 106 may enable voltage to the motor 104. However, from two hundred and fifty-seven to five hundred and twelve, the driver 106 disables voltage to the motor 104. Thus, a duty cycle is established for controlling the motor 104 and thus controlling the voltage applied to the component 105.

When the device 100 is powered on, the control logic 120 obtains the data stored in the register 118 indicative of whether the motor 104 operates in voltage mode or current mode, as described herein. The control logic 120 then controls operation of the motor 104 in accordance with the mode indicated by the data in the register 118. In this regard, if the register 118 indicates that the motor 104 is to be voltage mode controlled, then the control logic 120 drives the motor 104 with a duty cycle as prescribed by the nine-bits provided by the initialization logic 112, as described herein.

If however, the register 118 indicates that the motor 104 is to be current mode controlled, then the data stored in the register 118 is used by the control logic 120 to set a motor current set point. The "motor current set point" refers to a value indicative of the desired current through the motor 104. In this regard, in current mode, the driver 106 varies the voltage provided to the motor 104 based upon the motor current set point. The driver 106 determines what the measured current is in the motor coils by monitoring the motor via a sense resistor, described herein with reference to FIG. 3. In response to the measured current flowing in the motor 104, the driver 106 switches the voltage being provided to the motor 104 on and/or off in response to comparing the motor current set point to the real time measurement of the current in the motor 104. In contrast, as described herein, in voltage mode, the voltage "on" and "off" cycle is set by the PWM value stored in the register 118 in that the control logic 120 provides voltage to the motor 104 based upon the PWM value stored in the register.

In this regard, the control logic 120 provides voltage to the motor 104 based upon the measured motor current within the motor coils monitored by the control logic 120. Thus, if the measured current exceeds the motor current set point during operation, then the control logic 120 disables the voltage being applied or continues to disallow voltage application until the measured current is below the set point. Likewise, if the measured current is below the set point, the control logic 120 enables voltage to the motor 104 or continues to apply voltage to the motor 104 in response to the comparison.

Figure 3:
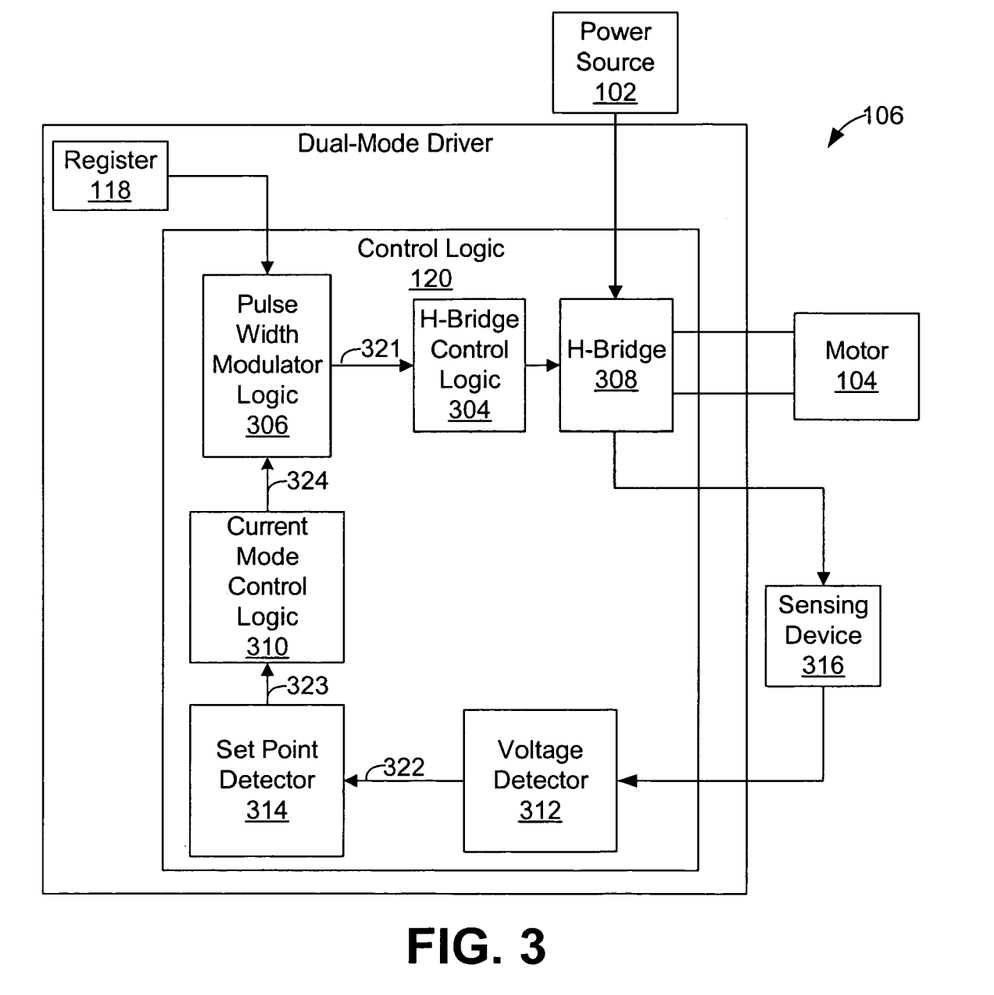
FIG. 3 is a block diagram of an exemplary dual-mode driver, such as is depicted in FIG. 2.

FIG. 3 is a block diagram depicting an exemplary dual-mode driver 106 of the present disclosure. The control logic 120 of the dual-mode driver 106 comprises pulse width modulator (PWM) logic 306, which is described in more detail herein.

The PWM logic 306 produces a PWM control signal 321 and transmits the PWM control signal 321 to H-Bridge control logic 304. In voltage mode, the PWM control signal 321 is representative of the PWM value written to the register 118, as described above. Thus, if the register 118 stores a "256" then the control signal 321 ensures a fifty-percent duty cycle for the motor 104, as described herein.

The H-Bridge control logic 304 controls operation of the H-Bridge 308. In this regard, the H-Bridge control logic 304 controls activation and/or deactivation of the H-Bridge 308, as described further with reference to FIG. 4, such that the motor 104 is provided voltage in accordance with the modulated control signal 321. For example, if the PWM value is "256," then the H-Bridge control logic 304 activates the H-Bridge so that voltage is applied to the motor 104 for two hundred and fifty-six counts. The H-Bridge control logic 304 then deactivates the H-Bridge so that voltage is not applied to the motor 104 for two hundred and fifty-six counts. Note that one cycle in this example is five hundred and twelve counts. Thus, one "PWM cycle" is from one to five hundred and twelve counts. The start of a PWM cycle then is when the count begins at one.

The PWM logic 306 is communicatively coupled to the H-bridge control logic 304, which controls the H-bridge 308. Note that the H-Bridge 308 is described in more detail herein, however, such an H-Bridge 308 preferably enables and/or disables voltage to the motor 104. Furthermore, the H-Bridge enables the driver 106 to further control the direction of the motor 104.

As an example, to turn on the motor 104, the logic 304 transmits a signal to the H-bridge 308 to activate or deactivate the power supplied to the motor in a first direction, i.e., the motor 104 moves in a first direction. Further, the logic 304 may transmit a signal to the H-Bridge 308 to activate or deactivate power supplied to the motor 104 in a second direction, i.e., reverse the motor 104. The H-bridge 308 is described in more detail with reference to FIG. 4.

The power source 102 supplies direct current (DC) voltage to the H-bridge 308. The H-Bridge logic 304 varies the DC voltage supplied by the power source 102 in accordance with the output of the PWM logic 306 by controlling the H-Bridge 308.

The dual-mode driver 106 further comprises voltage detector 312, set point detector 314, and current mode control logic 310. A sensing device 316 is preferably electrically coupled to the H-bridge 308 such that the current flowing through the sensing device 316 is indicative of the current that is flowing to the motor 104.

The voltage detector 312 is electrically coupled to the sensing device 316 such that an output 322 of the voltage detector 312 is indicative of the voltage differential across the sensing device 316. Furthermore, the voltage detector 312 is electrically coupled to a set point detector 314.

The set point detector 314 compares the voltage output 322 received from the voltage detector 312 to a motor current set point, as described herein. Such a motor current set point is defined by a current value about which the motor 104 is to operate, which is described in more detail with reference to FIG. 4.

If the voltage detected exceeds the set point, the set point detector 314 transmits a set point signal 323 indicating that the current in the motor 104 has exceeded the set point. Such signal 323 is transmitted to current mode control logic 310.

If the driver 106 is operating in current mode, the current mode control logic 310 then transmits a current mode PWM signal 324 to the PWM logic 306. The PWM logic 306 uses such signal 324 to drive the motor 104, as opposed to using the PWM value from the register 118.

As described herein, the initialization logic 112 writes data to the register 118 indicative of whether the motor 104 is to be operated in voltage mode or control mode. In one embodiment, the register 118 comprises nine bits for storing data indicative of the PWM value with which to drive the motor 104 as described herein. When the register 118 indicates that the motor 104 is to be operated in current mode, the data in the register 118 may then be used to establish the set point, which will be described in more detail with reference to FIG. 5.

When the motor 104 is to be driven in voltage mode, the initialization logic 112 writes, to the register 118, PWM values that the PWM logic 306 uses to establish the PWM control signal 321 that the PWM logic 306 transmits to the H-Bridge control logic 304. In this regard, the H-bridge 308 applies such PWM values to the motor 104.

In such an example, the register 118 may further store a value indicative of the polarity of the motor 104. Thus, if one particular bit exhibits a high value, i.e., a "1," then such a value dictates that the PWM logic 306 drive the motor in a positive direction using the PWM values. However, if the same particular bit exhibits a low value, i.e., "0," then such a value dictates that the PWM logic 306 drive the motor in a negative direction using the PWM values.

As described herein, the initialization logic 112 may further store data indicative of current mode in the register 118, if the motor 104 operates in current mode. If the motor 104 is operated in current mode, instead of using the data stored in the register 118 to designate the duty cycle for driving the motor 104, the PWM logic 306 uses the data stored in the register 118 to set the set point value as indicated herein. As an example, the motor 104 may be a current mode device having a current set point of 2 milliamps (mA). The logic 306 ensures that the current in the motor 104 is regulated to the 2-mA set point during operation.

Figure 4:
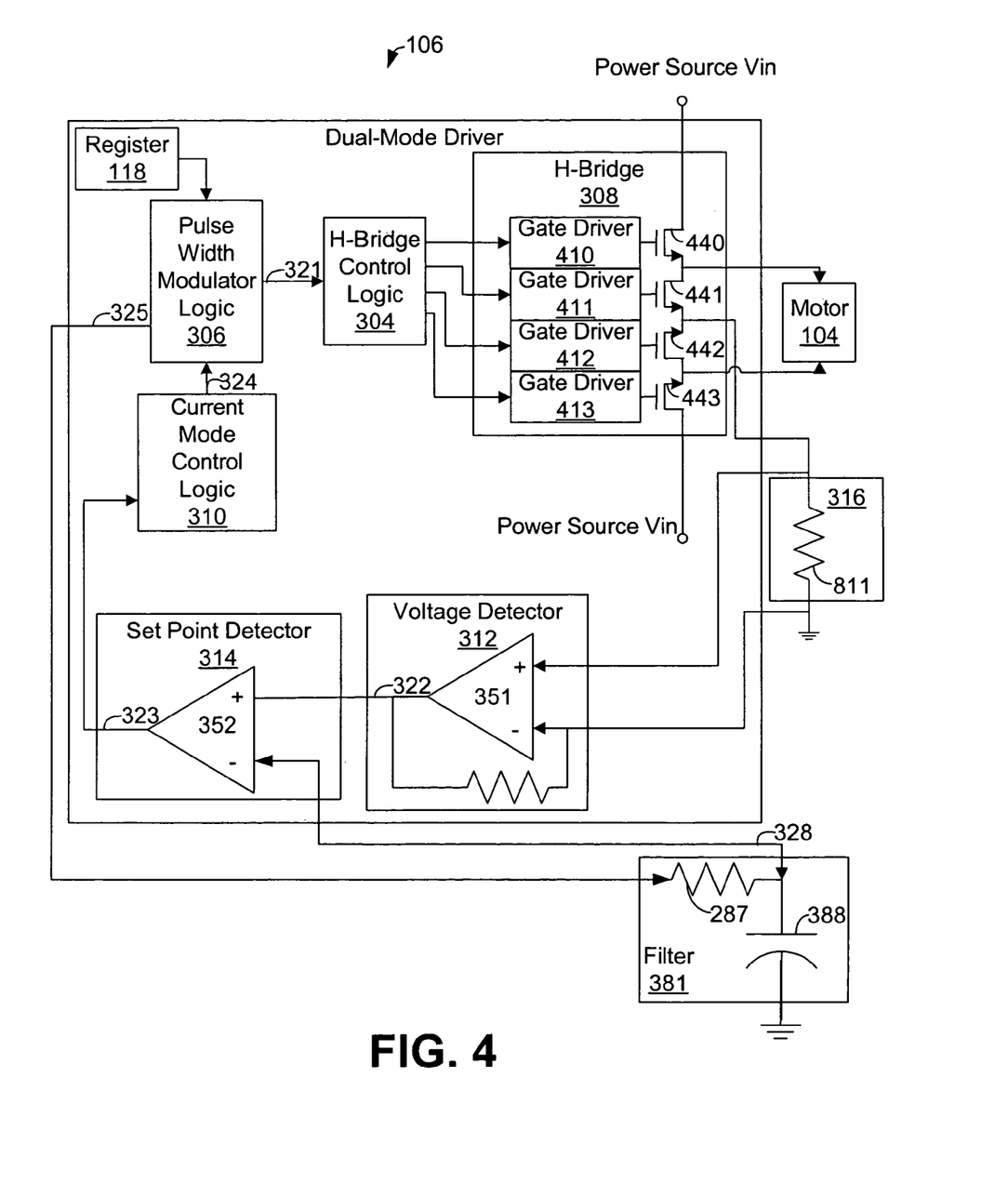
FIG. 4 is a block schematic illustrating an exemplary dual-mode driver, such as is depicted in FIG. 3.

FIG. 4 depicts an exemplary block schematic of the driver 106 of FIG. 3.

The H-Bridge 308 comprises four switching elements 440–443 corresponding respectively to four gate drivers 410–413. Switching elements 440–443 are illustrated as exemplary transistors. However, other switching elements may be used in other embodiments. During operation, the H-Bridge control logic 304 controls which gate drivers 410 activate and/or deactivate the switching elements 440–443. The H-Bridge activates and/or deactivates the switching elements 440–443 based upon the control signal 321 provided by the PWM logic 306.

When the register 118 indicates that the motor 104 is to operate in voltage mode, the PWM logic 306 transmits the signal 321 indicative of the PWM value in the register to the control logic 304. However, when the register 118 indicates that the motor 104 is to operate in current mode, the PWM logic 306 transmits the PWM control signal 321 indicative of a current mode PWM signal 324 based upon the relative motor current and the motor current set point.

When the register 118 indicates that the motor 104 is to be operated in current mode, the PWM logic 306 transmits a motor current set point 325 to a filter 381 indicative of the PWM value stored in the data register 118, e.g., "256." Voltage indicative of the PWM duty cycle is then stored via the filter 381. Note that the filter 381 sets a set point about which the motor 104 operates. In this regard, while an RC filter 381 is depicted as storing such a set point, other devices for setting the set point of the motor 104 in other embodiments are possible.

In this regard, the signal 325 causes a voltage drop across a resistor 287 that is then stored in a capacitor 388. Such stored voltage in the capacitor 388 is then used as the motor set point for controlling the voltage applied to the motor 104.

As described herein, the data stored by the initialization logic 112 is stored in register 118. When the PWM logic 306 is operating in voltage mode, the PWM logic 306 uses such data as the duty cycle for driving the motor 104 via the PWM control signal 321. In contrast, however, when the PWM logic 306 is operating in current mode, the PWM logic 306 uses such data to define a motor current set point indicative of a set point about which the current in the motor 104 is to oscillate.

Thus, as an example, if the register 118 is a nine-bit register, then there are five hundred and twelve possible PWM values that may be stored in the register 118, as described herein. Notably, the initialization logic 112 sets the PWM value based upon the duty cycle for the particular motor 104 that is being driven by the dual-mode driver 106.

In one embodiment, the voltage detector 312 comprises a differential amplifier 351. The positive ("+") input and the negative ("−") input of the differential amplifier 351 are connected across a low impedance sense resistor 811 of the sensing device 316. Thus, the output 322 is indicative of the voltage drop across the resistor 811. Note that the sensing device 316 is illustrated as comprising the resistor 811 for sensing a current through the motor 104. However, other types of sensing devices 316 are possible in other embodiments for sensing the motor current.

Furthermore, the set point detector 314 comprises an amplifier 352. The positive ("+") input is connected to the output 322 of the differential amplifier 351, which is indicative of the voltage drop across the resistor 811. The negative ("−") input of the amplifier 352 is connected to the RC filter 381. As described herein, the capacitor 388 stores a value indicative of the motor set point for the motor 104. The amplifier 352 transmits a signal 323 when the output 322 is greater than the set point from signal 328.

As an example, the voltage provided the dual-mode driver 106 might be 3.3 Volts. As described herein, the initialization logic 112 may place "256" in the register 118. Thus, the PWM logic would apply the PWM value, e.g., "256," which would be approximately 1.65 Volts, i.e., half of the voltage provided the driver 106 representative of half of the possible five hundred and twelve PWM values. Furthermore, if the resistor 811 were a one (1) Ohm resistor, then the motor set point would be approximately 1.65 amps. Such a set point represents a current value about which the motor 104 is to operate. Thus, the capacitor 388 stores an electrical charge that is compared by the set point detector 314 to the voltage detected in the sense resistor 811.

In this regard, if the current through resistor 811 exceeds 1.65 amps, then the PWM logic 306 cycles the PWM control signal 321 that is being transmitted to the H-Bridge control logic 304. Therefore, the voltage being applied to the motor 104 is eliminated, if voltage is currently being applied. If the current through resistor 811 falls below the 1.65 Amps, then the PWM logic cycles the PWM control signal 321 that is being transmitted to the H-Bridge control logic 304 thereby turning the voltage on if voltage is currently not being applied. Therefore, voltage is applied to the motor 104 when the current falls below the set point.

Figure 5:
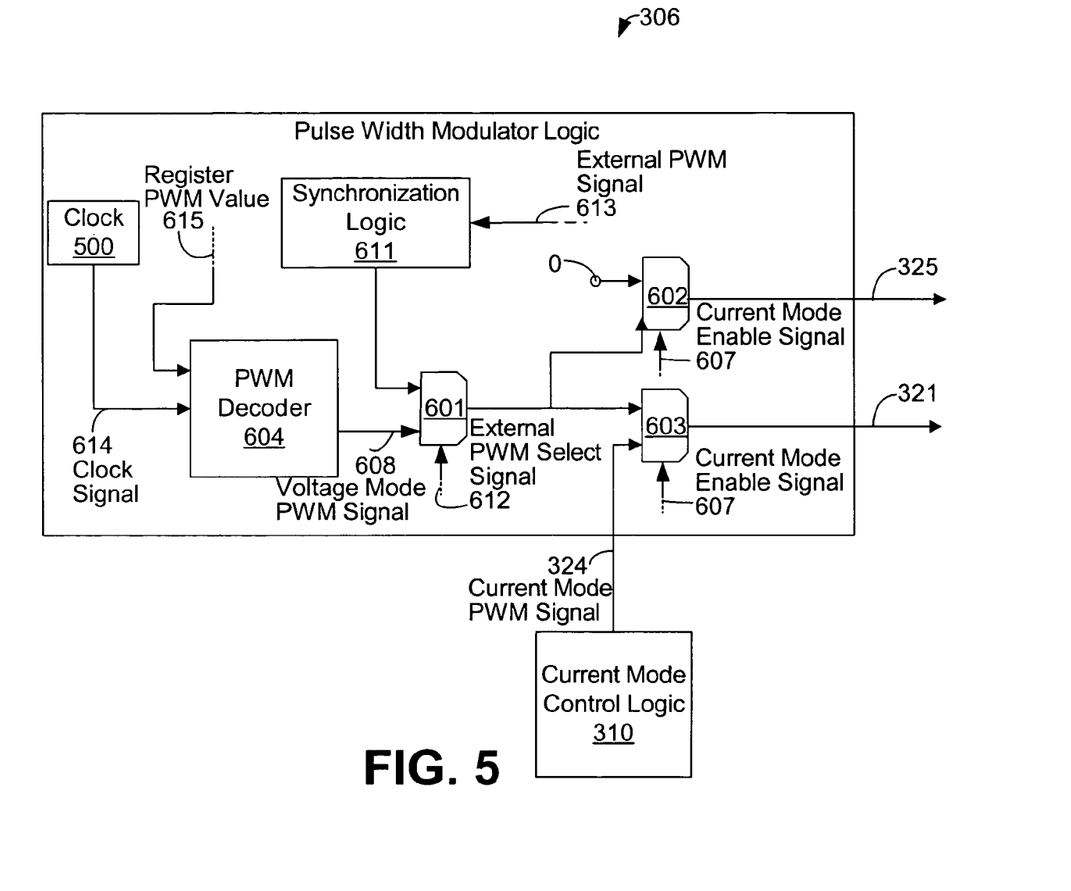
FIG. 5 is a block schematic illustrating exemplary PWM logic, such as is depicted in FIG. 4.

FIG. 5 depicts exemplary PWM logic 306 of FIG. 4. The PWM logic 306 comprises a clock 500, PWM decoder 604, and three multiplexers 601–603. The clock 500 transmits a clock signal 614 to the PWM decoder 604. For example, the clock 500 may count from one to five hundred and twelve for nine-bit PWM values.

The PWM decoder 604 receives the clock signal 614 and retrieves the register PWM value 615 to the clock signal 614 in order to get the voltage mode PWM signal from the register 118 (FIG. 4). The PWM decoder 604 applies the register PWM value 615 to the clock signal 614 to generate the voltage mode PWM signal 608.

In one embodiment, the voltage mode PWM signal 608 and an external PWM signal 613 may be provided to the multiplexer 601. An external PWM select signal 612 may then be used in order to select the external PWM signal 613, as opposed to the voltage mode PWM signal 608 to provide the output PWM control signal 321. If the external PWM select signal 612 is not selected, e.g., exhibiting a logical "1," then the multiplexer 601 transmits the voltage mode PWM signal 608. Note that if an external PWM source is being used to provide the duty cycle, the external PWM signal 613 is synchronized by the synchronization logic 611.

If the external PWM select signal 612 does not indicate an external PWM source, then the voltage mode PWM signal 608 is transmitted to multiplexer 602 and 603. Each multiplexer 602 and 603 receives a current mode enable signal 607 that is indicative of the data mode data that is currently stored in the register 118. For example, the current mode enable signal might be a one ("1") read from the register 118 to indicate current mode and a zero ("0") to indicate voltage mode. The current mode enable signal 607 selects whether a current mode PWM signal 324 or the voltage mode PWM signal 608 will be transmitted by the PWM logic 306 as PWM control signal 321. Furthermore, the current mode enable signal 607 is the mode selection data that is stored in the register 118.

Thus, if the motor 104 is to be driven via voltage mode, the enable signal 607 will indicate voltage mode, e.g., the current mode enable signal 607 might be a logical "0." If, however, the motor 104 is to be driven via current mode, the enable signal 607 will indicate current mode, e.g., the current mode enable signal 607 might be a logical "1." Thus, the current mode enable signal 607 may be a logical "0" if the register indicates voltage mode and a logical "1" if the register 118 indicates current mode.

If the current mode enable signal 607 does not indicate current mode, then the multiplexer 602 transmits the voltage mode PWM signal 608 as the PWM control signal 321 to the H-Bridge control logic 304 (FIG. 5) that controls the H-Bridge 308 (FIG. 5). Therefore, the motor 104 will be driven with the PWM value that is being retrieved from the register 118. Furthermore, if the current mode enable signal 607 does not indicate current mode, then the multiplexer 602 selects the "zero" value as the current set point signal 325 that is transmitted to the filter 380 (FIG. 4). As described herein, the signal 325 establishes the motor set point for about which the driver 106 keeps the current through the motor 104.

If, however, the current mode enable signal 607 indicates current mode, then the current mode enable signal 607 selects the current mode PWM signal 324 that is controlled based upon the monitored motor current through the sense resistor 811. Furthermore, the voltage mode PWM signal 608 is transmitted to the filter 308, and the stored voltage resulting from the voltage mode PWM is used as an input to the amplifier 352 of the set point detector 314 to cycle the current mode PWM signal 324.

In this regard, if the current mode control logic 310 receives a signal from the set point detector 314 indicating that the current in the motor 104 has exceeded the current set point, then the current mode control logic 310 transmits a "zero" to the PWM logic 306. The PWM logic 306 turns off or continues to disable voltage to the motor 104. On the other hand, if the current mode control logic 310 receives a signal from the set point detector 314 indicating that the current in the motor 104 has fallen below the current set point, then the current mode control logic 310 transmits a "one" to the PWM logic 306. The PWM logic 306 turns on voltage or continues to leave on the voltage that is being provided to the motor 104.

Figure 6:
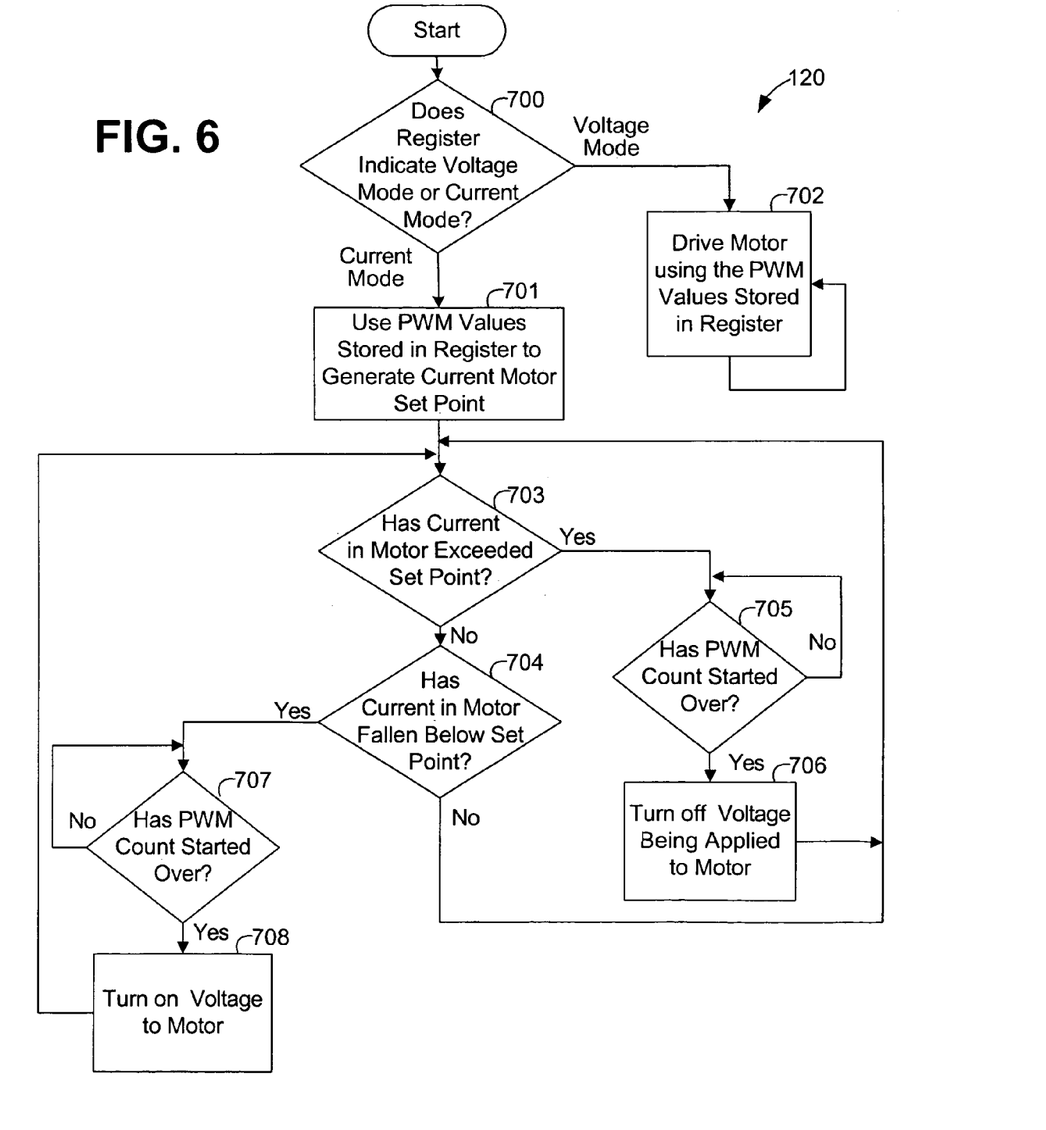
FIG. 6 is a flow chart illustrating an exemplary architecture and functionality of control logic, such as is depicted in FIG. 2, for controlling the mode of the driver.

An exemplary architecture and functionality of the control logic 120 is described with reference to FIG. 6.

If the register 118 (FIG. 2) indicates that the motor 104 (FIG. 1) is to operate in voltage mode in step 700, then the control logic 120 (FIG. 2) drives the motor 104 using the PWM values stored in the register 118 in step 702. As described herein, the register 118 is preferably populated by initialization logic 112 installed on the device during manufacturing.

Therefore, the appropriate initialization logic 112 will be installed by a user (not shown) depending upon the type of component 105 that the motor 104 will operate. In this regard, if the component 105 is to operate in voltage mode, then a user installs initialization logic 112 that writes, to the register 118, data indicative of voltage mode. Alternatively, if the component 105 is to operate in current mode, then a user installs initialization logic 112 that writes data, to the register 118, indicative of current mode. Therefore, the same driver 106 may be installed in the device 100 regardless of the type of control mode that may be needed by the component 105 attached to the motor 104.

If the register 118 indicates current mode in step 700, then the control logic 120 uses the PWM values stored in the register 118 to generate a current motor set point in step 701. The control logic 120 determines whether the PWM count is at "1," i.e., the PWM cycle has started over, in step 705. If it is not at "1," then the control logic 120 waits until such cycle starts over. Further, if the current in the motor 104 exceeds the set point in step 703, then the when the PWM count starts over in step 705, the control logic 120 turns off the voltage being applied to the motor 104 in step 706, and continues to motor the current in step 703.

Further, if the current in the motor 104 falls below the set point in step 704, and the control logic 120 determines that the PWM count is at "1," i.e., the PWM cycle has started over in step 707, the control logic 120 turns on the voltage to the motor 104 in step 708, and continues to monitor the motor at step 703. If it is not at "1," i.e., the PWM cycle has not started over in step 707, then the control logic 120 waits until such cycle starts over to adjust the voltage in step 708.

Notably, when the control logic 120 is operating in voltage mode, the control logic 120 applies the PWM value stored in the register 118 directly to the motor 104. Whereas, when the control logic 120 is operating in current mode, the control logic 120 uses the PWM value stored in the register 118 to determine a motor current set point. The control logic 120 then drives the motor 104 by monitoring the current in the motor 104 to vary the duty cycle applied to the motor 104.

The invention claimed is:

1. A motor control device, comprising:
   memory for storing a control mode value and a pulse width modulation (PWM) value; and
   logic configured to modulate an input voltage to a motor based upon the PWM value if the control mode value indicates voltage mode, the logic further configured to determine a motor set point value if the control mode value indicates current mode, the logic further configured to modulate the input voltage to the motor based upon the determined motor set point value.

2. The device of claim 1, further comprising a voltage detector coupled to a sense resistor, wherein a current through the sense resistor is indicative of an operating current in the motor.

3. The device of claim 2, wherein the voltage detector transmits an output indicative of the operating current in the motor.

4. The device of claim 3, further comprising a set point detector configured to compare the output indicative of the operating current in the motor to the determined motor set point value.

5. The device of claim 1, wherein the logic determines the motor set point value based upon the data indicative of the PWM value stored in the memory.

6. The device of claim 1, wherein the motor control device is coupled to initialization logic, the initialization logic configured to write the control mode data and the PWM value to the memory.

7. The device of claim 6, wherein the initialization logic is current mode initialization logic configured to write data indicative of current mode as the control mode data.

8. The device of claim 6, wherein the initialization logic is voltage mode initialization logic configured to write data indicative of voltage mode as the control mode data.

9. A motor control device, comprising:
   memory for storing data indicative of a control mode and a pulse width modulation (PWM) value; and
   an integrated circuit configured to drive the motor in either current mode or voltage mode depending upon the control mode indicated by the data.

10. The motor control device of claim 9, wherein the integrated circuit comprises a driver configured to drive the motor using the PWM value if the control mode data indicates voltage mode.

11. The motor control device of claim 9, wherein the integrated circuit comprises a driver configured to determine a motor current set point based upon the PWM value is if the control mode data indicates current mode.

12. A motor control device, comprising:
  memory for storing data indicative of a control mode and a pulse width modulation (PWM) value;
  a motor; and
  means for driving the motor in either current mode or voltage mode depending upon the control mode indicated by the data.

13. A method for controlling a motor, the method comprising:
  storing data indicative of a control mode and a pulse width modulation PWM value in memory;
  modulating an input voltage provided to a motor using the PWM value if the data indicative of the control mode indicates voltage mode;
  modulating the input voltage provided to the motor based upon a motor current set point value if the data indicative of the control mode indicates current mode.

14. The method of claim 13, further comprising detecting a current through a sense resistor indicative of an operating current in the motor.

15. The method of claim 14, further comprising transmitting an output indicative of the operating current in the motor.

16. The method of claim 15, further comprising the step of comparing the output indicative of the operating current in the motor to a motor current set point.

17. The method of claim 16, further comprising determining the motor set point based upon the data indicative of the pulse width modulation (PWM) value stored in memory.

18. The method of claim 13, further comprising writing the control mode data and the PWM value to the memory via initialization logic communicatively coupled to the memory.

19. The method of claim 18, further comprising writing control mode data indicative of current mode to the memory if the motor is to be operated in current mode.

20. The method of claim 18, further comprising writing control mode data indicative of voltage mode to the memory if the motor is to be operated in voltage mode.

21. A method for controlling a motor, comprising:
  storing data indicative of a control mode and a pulse width modulation (PWM) value in memory; and
  driving the motor in either current mode or voltage mode depending upon the control mode indicated by the data.

* * * * *

UNITED STATES PATENT AND TRADEMARK OFFICE
CERTIFICATE OF CORRECTION

PATENT NO.         : 7,112,937 B1
APPLICATION NO. : 11/263323
DATED              : September 26, 2006
INVENTOR(S)        : Steve P. Stemple et al.

Page 1 of 1

It is certified that error appears in the above-identified patent and that said Letters Patent is hereby corrected as shown below:

On the title page, item (73), in "Assignee", in column 1, line 2, delete "LP.," and insert -- L.P., --, therefor.

In column 10, line 66, in Claim 11, after "value" delete "is".

Signed and Sealed this

Fifth Day of May, 2009

JOHN DOLL
*Acting Director of the United States Patent and Trademark Office*